(12) United States Patent
Tseng

(10) Patent No.: US 9,959,321 B2
(45) Date of Patent: May 1, 2018

(54) RANKING SEARCH RESULTS BY SOCIAL RELEVANCY

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 60 days.

(21) Appl. No.: 14/938,636

(22) Filed: Nov. 11, 2015

(65) Prior Publication Data

US 2016/0063003 A1    Mar. 3, 2016

Related U.S. Application Data

(63) Continuation of application No. 12/890,317, filed on Sep. 24, 2010, now Pat. No. 9,268,865.

(51) Int. Cl.
*G06F 17/30* (2006.01)

(52) U.S. Cl.
CPC ...... *G06F 17/3053* (2013.01); *G06F 17/3087* (2013.01); *G06F 17/30241* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 8,606,721 | B1* | 12/2013 | Dicker | G06Q 10/10 705/319 |
| 2007/0112761 | A1* | 5/2007 | Xu | G06F 17/30616 |
| 2008/0255977 | A1* | 10/2008 | Altberg | G06F 17/30979 705/35 |
| 2008/0313165 | A1* | 12/2008 | Wu | G06Q 10/101 |
| 2009/0281988 | A1* | 11/2009 | Yoo | G06F 17/30867 |
| 2010/0036807 | A1* | 2/2010 | Lieske, Jr. | G06F 17/30241 707/737 |
| 2010/0306138 | A1* | 12/2010 | Hotes | G06Q 30/0206 706/12 |
| 2011/0099164 | A1* | 4/2011 | Melman | G06F 17/3064 707/723 |
| 2011/0137902 | A1* | 6/2011 | Wable | G06F 17/30867 707/737 |
| 2012/0047129 | A1* | 2/2012 | Redstone | G06F 17/3087 707/723 |

* cited by examiner

*Primary Examiner* — Christopher J Raab
(74) *Attorney, Agent, or Firm* — Baker Botts, L.L.P.

(57) ABSTRACT

In one embodiment, a search request is received from a first user, the request including the first user's location. A set of search results and their corresponding geographic locations are determined in response to the search request. For each search result, a weighted rating value is determined based on user ratings provided by one or more second users, an affiliation coefficient between the first user and each second user providing a user rating, and a proximity coefficient based on the distance between the first user's location and the geographic location of the search result. The search results are ranked by their respective weighted rating values and sent to the first user.

20 Claims, 6 Drawing Sheets

| Name | Proximity | Avg. Rating |
|---|---|---|
| sushi 1 | 0.2 mi | ☆☆☆ (15) |
| sushi 2 | 1.0 mi | ☆☆ (25) |
| sushi 3 | 3.5 mi | ☆☆ (12) |

FIGURE 4

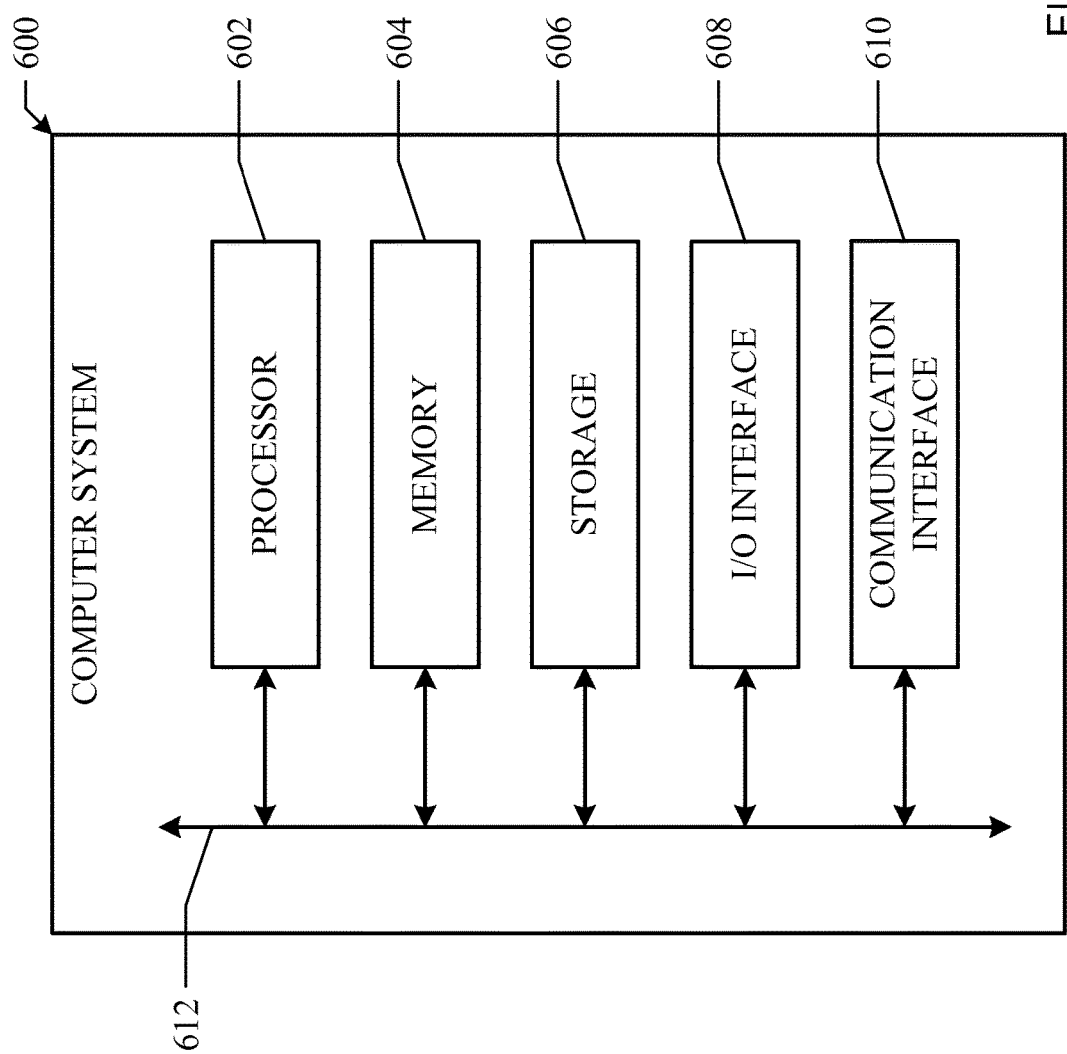

RANKING SEARCH RESULTS BY SOCIAL RELEVANCY

PRIORITY

This application is a continuation under 35 U.S.C. § 120 of U.S. patent application Ser. No. 12/890,317, filed 24 Sep. 2010, which is incorporated herein by reference.

TECHNICAL FIELD

The present disclosure relates generally to location-based social network services and, more particularly, to improving searches for locations within the vicinity of users.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to location based services with enhanced searching functionality that considers social relevancy in searching for nearby places and analyzing ratings of nearby places. These and other features, aspects, and advantages of the disclosure are described in more detail below in the detailed description and in conjunction with the following figures.

BRIEF DESCRIPTION OF THE DRAWINGS

FIG. 2A illustrates an example of ranking places by proximity coefficients.

FIG. 2B illustrates an example of ranking users by affiliation coefficients.

FIG. 2C illustrate an example of tables of rating data.

FIG. 4 illustrates an example user interface displaying search results.

FIG. 6 illustrates an example computer system.

DETAILED DESCRIPTION

Figure 1:
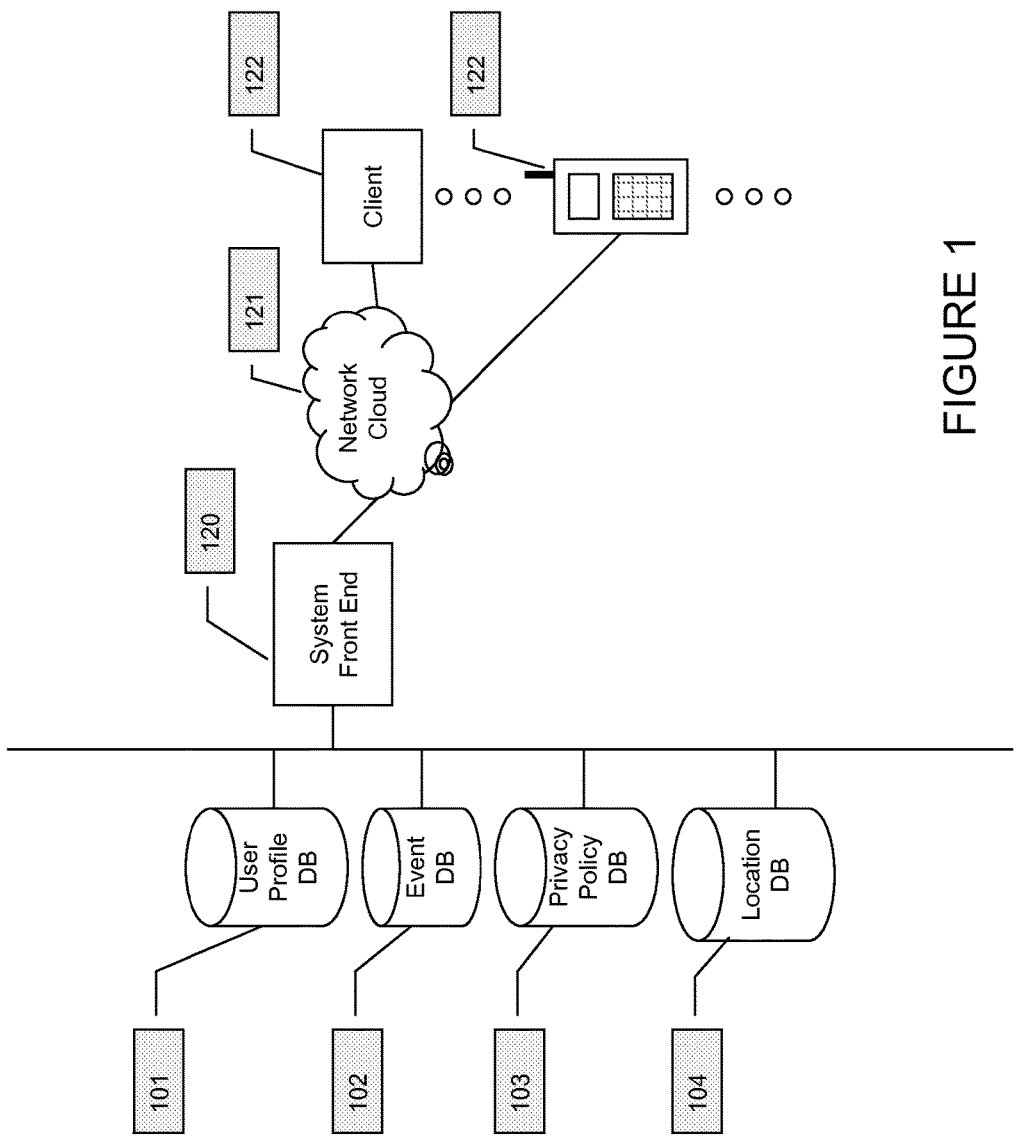
FIG. 1 illustrates an example social networking system with location-based services and capabilities.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention.

FIG. 1 illustrates an example social networking system with location-based services and capabilities. In particular embodiments, the social networking system may store user profile data in user profile database 101. In particular embodiments, the social networking system may store user event data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store geo-location data identifying a real-world geographic location of an object, such as a mobile device, associated with a check-in. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning.

In particular embodiments, location database 104 may store an information base of places, where each place includes a name, a geographic location and meta information. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid (i.e., geometric center) of the shape. For example, meta information of a place can include information identifying the user that initially created the place, reviews, ratings, comments, check-in activity data, and the like.

Places may be created by administrators of the system and/or created by users of the system. For example, a user may register a new place by accessing a client application to define a place name and provide a geographic location and cause the newly created place to be registered in location database 104. The creating user or other users may access a web page directed to the page and add additional information, such as reviews, comments and ratings for the place. In particular embodiments, location database 104 may store a user's location data. For example, location database 104 may store a user's check-in activities. For example, a user can create a place (e.g., a new restaurant or coffee shop), causing the social networking system to store the user created place in location database 104. For example, a user can create a comment, a review, or a rating of a place, causing the social networking system to store the user's comment, review and rating of the place in location database 104. For example, a user's rating of a place can be as simple as clicking a "like" button on a web page associated with the place, or can be a quantitative measure like the star rating system used for rating restaurants. An example star rating system is the Michelin Guide rating system: one star for "a very good restaurant in its category", two stars for "excellent cooking and worth a detour", and three starts for "exceptional cuisine and worth the journey". For example, a rating for a place can be based on number of positive comments/reviews or negative comments/reviews about the place. For example, a place with 10 positive reviews can have a rating of 10, a place with 5 negative reviews can have a rating of −5, and a place with 5 positive reviews and 5 negative reviews can have a rating of 0.

In connection with creation of a place, a check-in, or a search of nearby places in general, a user can provide a text string describing a place (such as a name) and a geographic location to the social networking system. A geographic location can be a set of geographic coordinates (latitude and longitude) based on a positioning technology (e.g., GPS, cell tower triangulation, or Wi-Fi positioning), and/or an address. The social networking system may search location database 104 in part on the geographic location provided by the user and the respective geographic locations of the places in the database, and provide the user a list of places near the geographic location that match the text string (completely or partially). However, a place search of nearby places based on a distance from a user's current location can yield results that may or may not be relevant to the user. For example, if a user is in San Francisco's Financial District neighborhood (e.g., 100 Montgomery Street, San Francisco, Calif.) and wants to search a nearby coffee shop, a place search result may contain a random list of 10 coffee shops within walking distance. However, a place search result may be more relevant to a user if the place search takes into account social graph information and activities of other users of the social network. As in the previous example, the 10 coffee shops can be ranked according to the user's or the user's friends' activity—, for example, a number of times that the user had recently checked in at any of the 10 coffee shops, or whether any of the 10 coffee shops is rated by one or more friends of the user (e.g., "like", or "3 out of 5 starts"). Particular embodiments below describe methods in improving search results by ranking search results based on social relevancy.

Figure 2:
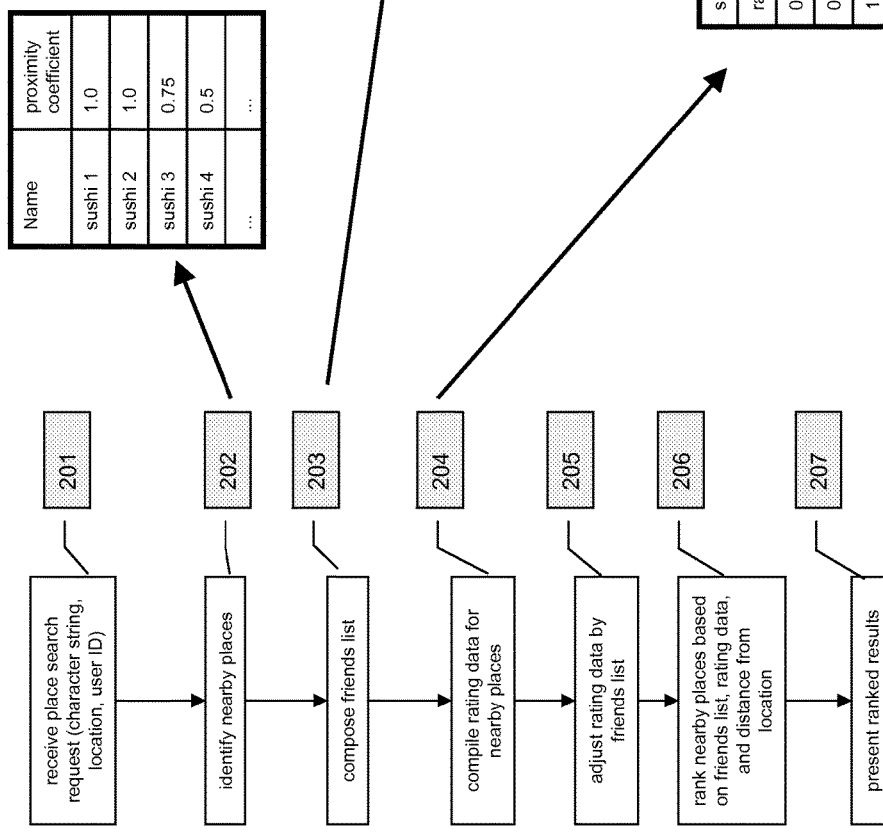
FIG. 2 illustrates an example method of ranking a search result based on social relevancy.

FIG. 2 illustrates an example method of ranking search results based on social relevancy. The method illustrated in FIG. 2 may be implemented by a search process hosted on one or more computing devices of the social networking system. In particular embodiments, the search process may receive from a user a request to search nearby places (201). In particular embodiments, the user may request a place search by providing a character string, a location and a user identifier. For example, a user can request a place search by typing in a character string (e.g., a restaurant name, or "sushi") in a client application on the user's GPS-capable mobile device 122, which causes the mobile device to transmit the character string, GPS coordinates of the user's current location, and the user's ID to the social networking system. In one embodiment, the character string may be an empty character string. For example, if a user wants to search a nearby place to check in, the user can submit the user's current location and the user's ID to the social networking system.

In particular embodiments, the search process may access location database 104 and identify nearby places (202). In particular embodiments, the social networking system may access location database 104 and identify one or more places that are within a threshold distance from the user's current location. For example, the search process can access location database 104 and identify places that are within one mile for the user's current location. In particular embodiments, the search process may access location database 104 and identify one or more nearby places wherein a place identifier (e.g., a name, a metadata value) of each place matches the character string partially or completely. For example, if a user wants to search for, or check in to, a nearby coffee shop, the user can type "coffe" in a web page or a client application. The search process can return a list of nearby coffee shops, e.g., Starbucks Coffee, Peet's Coffee and Tea, Dunkin' Donuts, etc.

In particular embodiments, the search process may rank the identified nearby places by proximity of each identified place to the user's current location. In particular embodiments, the social networking system may assign each identified place a proximity coefficient. For example, a place can have a proximity coefficient of 1.0 if the place is within 500 feet from the user, or a proximity coefficient of 0.75 if the place is between 500 feet to 1000 feet away from the user, or a proximity coefficient of 0.5 if the place is between 1000 feet and one mile from the user. In particular embodiments, the search process may initially rank the identified nearby places by proximity coefficients. In particular embodiments, the social networking system may arrange the identified nearby places in a table, sorted by proximity ranking FIG. 2A illustrates an example of ranking places by proximity coefficients. In the example of FIG. 2A, the search process can arrange the identified nearby places in a table, from the highest proximity coefficient (closest to a user in geographic distance) to the lowest proximity coefficient (most distant from a user geographically).

In particular embodiments, the search process may compose a friends list of the user requesting a place search (203). In particular embodiments, the search process may receive a user identifier from the requesting user, access user profile database 101, and based on the user identifier, compose a friends list by identifying users who are within a certain degree of separation in the requesting user's social network. For example, a friends list can be composed of friends and friends of friends of a requesting user—i.e., within two degrees of separation of the requesting user.

In particular embodiments, the search process may rank users in the friends list by each user's affiliation with the requesting user, or social proximity between each user in the friends list and the requesting user. In particular embodiments, the search process may assign each user in the friends list an affiliation coefficient. For example, the search process can assign an affiliation coefficient of 1.0 if a user in the friends list is the requesting user's parent, or an affiliation coefficient of 0.9 if the user in the friends list frequently communicate with the requesting user, or an affiliation coefficient of 0.7 if the user in the friends list is a friend of friend of the requesting user, and the user and the requesting user went to the same college at the same time. Interactions between users on social networking system, such as chats, wall posts, emails, and the like, can also be used in scoring affinities between users. A system for measuring user affinity is described more generally in U.S. patent application Ser. No. 11/503,093, filed on Aug. 11, 2006, which is hereby incorporated by reference in its entirety and for all purposes. In particular embodiments, the social networking system may rank each user of the friends list by affiliation coefficients. In particular embodiments, the social networking system may arrange users in the friends list in a table, sorted by affiliation coefficients. FIG. 2B illustrates an example of ranking users by affiliation coefficients. In the example of 2B, the social networking system can arrange the users in the friends list in a table, from the highest affiliation coefficient (closet to a user in social relationship) to the lowest affiliation coefficient (most distant from a user in social relationship).

In particular embodiments, the search process may access location database 104 and compile rating data for the identified nearby places (204). In addition, the search process may access external or third party systems that contain rating information submitted by users, such as the service provided by Yelp, Inc. of San Francisco, Calif. In particular embodiments, rating data for an identified nearby place may comprise a set of one or more rating values, and a source for each rating values. For example, rating values can range from a highest number for best rating (e.g., 1.0 for "best in town") to a lowest number for lowest rating (e.g., 0.1 for "avoid!"). For example, a source can be an individual user who authors the rating values, or a source can be an entity or enterprise that authors the rating values (e.g., Sunset magazine). In particular embodiments, the search process may arrange rating data for each identified place in a table comprising a name for an identified place, one or more rating values, and a source for each rating values. FIG. 2C illustrate an example of tables of rating data. In some implementations, rating data may also be filtered from the analysis to exclude older or out-of-date ratings.

Figure 3:
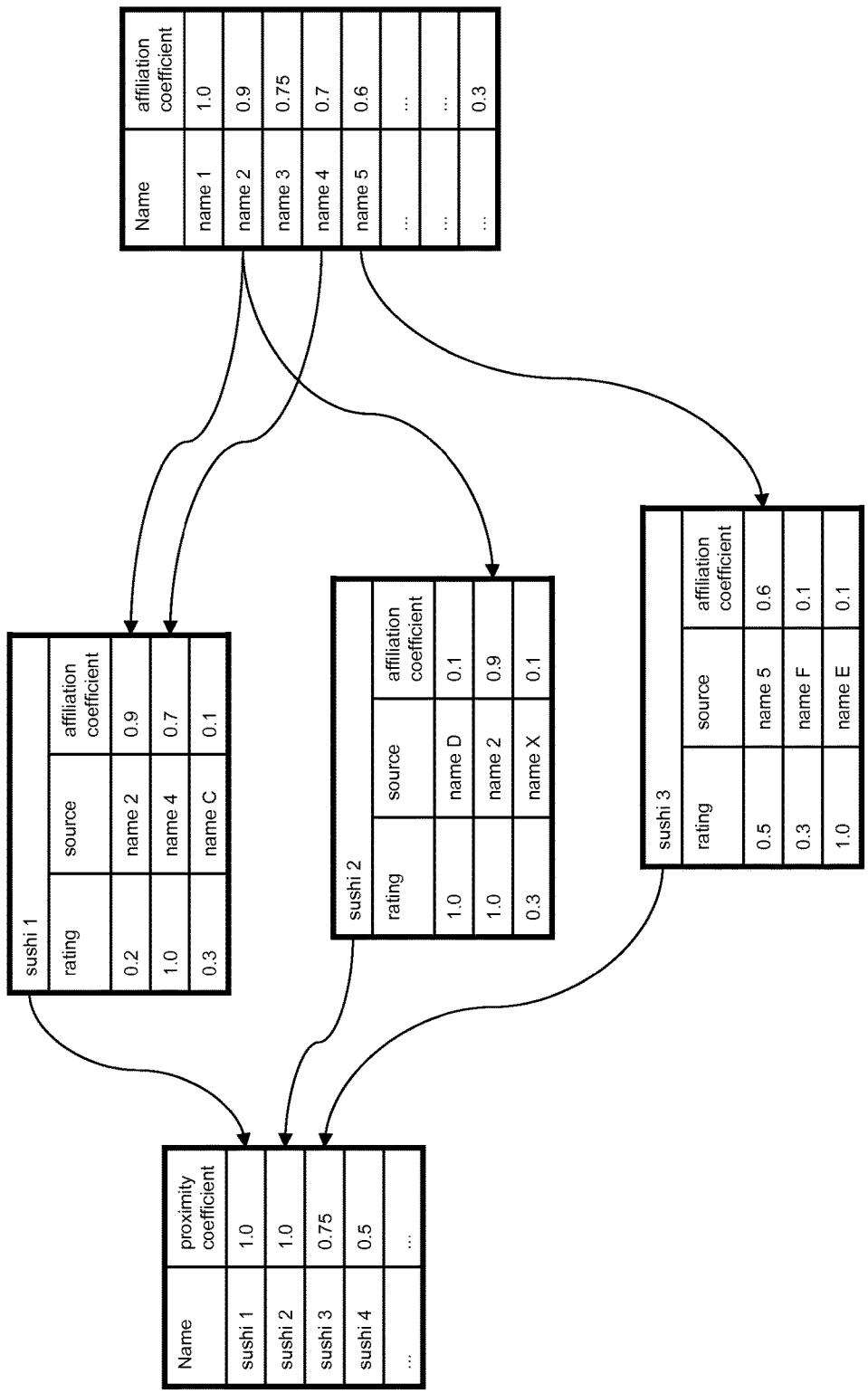
FIG. 3 illustrates an example of mapping friends to rating data.

The search process can improve the quality of search results by incorporating the social relationship information of the requesting user. In particular embodiments, the search process may adjust the rating data by the friends list for the nearby place search (205). In particular embodiments, the search process may identify one or more sources of the rating data that are on the friends list. In particular embodiments, the search process may adjust the rating data by mapping affiliation coefficients of the one or more sources that are on the friends list to the rating data. FIG. 3 illustrates an example of mapping friends to rating data. In the example of FIG. 3, the search process can copy affiliation coefficients to tables of rating data for the user 2, user 4 and user 5 as those users are on the friends list. In particular embodiments, if a source in rating data is not on the friends list, then the search process may select a default value as an affiliation coefficient for the source. In the example of FIG. 3, user name C, name D, name X, name F and name E are not on the friends list, then the search process can set a default affiliation coefficient value (e.g., 0.1) in the tables for rating data. The default value can vary based on the type of source with more trusted sources having a better value.

In particular embodiments, the search process may rank the identified nearby places by the friends list, rating data, and a distance between each identified place and the requesting user's current location (206). In particular embodiments, the search process may rank the identified nearby places by calculating a weighted average value in rating data for each identified nearby place based on the proximity coefficient and the affiliation coefficient. For example: weighted average rating=proximity coefficient×average (rating number× affiliation coefficient). As in the example of FIG. 3:

for sushi 1: weighted average rating=$1.0 \times (0.2 \times 0.9 + 1.0 \times 0.7 + 0.3 \times 0.1)/3 = 0.30$, for sushi 2: weighted average rating=$1.0 \times (1.0 \times 0.1 + 1.0 \times 0.9 + 0.3 \times 0.1)/3 = 0.34$, and for sushi 3: weighted average rating=$0.75 \times (0.5 \times 0.6 + 0.3 \times 0.1 + 1.0 \times 0.1)/3 = 0.11$.

Thus the nearby places can be ranked, from the highest to the lowest in the weighted average rating, sushi 1, sushi 2, and sushi 3.

In additional to social relationship (e.g., the friends list) and geographic proximity, other factors such as recency of a rating value can also be considered in calculating an average value in the rating number. In particular embodiments, the search process may rank the identified nearby places by calculating a weighted average value in rating number for each identified nearby place based on the proximity coefficient, the affiliation coefficient, and recency for each rating number. For example, the social networking system can set a rating value to zero (i.e., not considering the particular rating at all), if the particular rating number is more than 3 years old (e.g., the rating number was authored more than 3 years ago).

In particular embodiments, the search process may present the ranked list of identified nearby places to the requesting user (207). In particular embodiments, the search process may present to the requesting user the ranked list of identified nearby places sorted by ranking (e.g., ordering by the weighted average rating from high to low). In particular embodiments, the social networking system may present to the requesting user the ranked list of identified nearby places sorted by affiliation (e.g., presenting first a nearby place with most ratings authored by the requesting user's friends). In particular embodiments, the social networking system may present to the requesting user the ranked list of identified nearby places sorted by categories, and the requesting user may view one or more places in the ranked list of identified nearby places by selecting a particular category. For example, if the requesting user searches "sushi", the social networking system can present the ranked list by restaurant categories (e.g., Japanese, California, Fusion, Bar, etc.) and the requesting user can select and view one of the categories.

FIG. 4 illustrates a user interface that may be presented to a mobile device of the user in response to the search request. As FIG. 4 illustrates, the user interface may include a ranked list of search results. Each search result may include a place name, a distance from the user's current location and an average weighted rating value. A user may select a given place on the list to access a page that corresponds to the place to view more detail information, such as address information and individual ratings.

Figure 5:
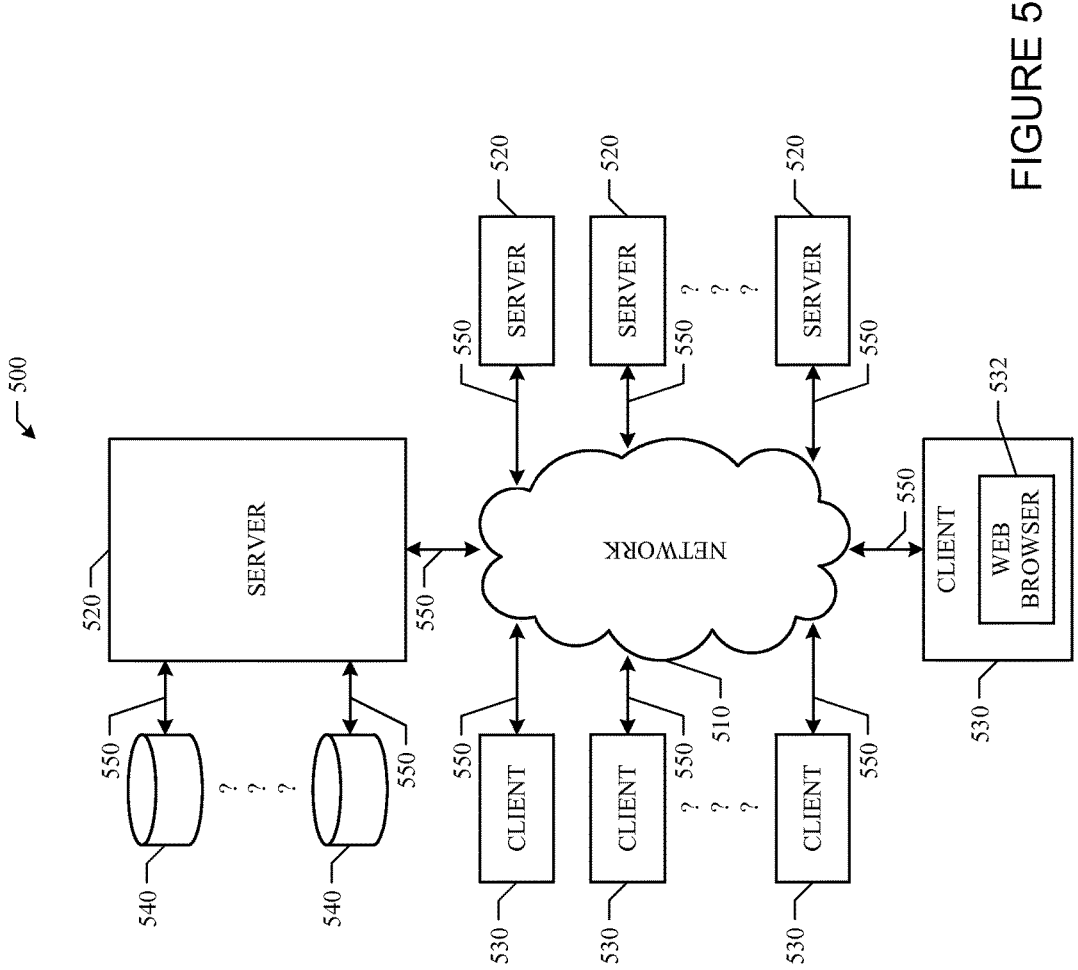
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by a computing device, receiving a search request from a first user, wherein the search request comprises a location of the first user;
by the computing device, determining one or more search results in response to the search request, each of the one or more search results having a corresponding geographic location;
by the computing device, for each search result, determining a weighted average rating value by:
determining one or more rating values associated with the search result, the one or more rating values being associated with one or more second users, respectively;
for each of the rating values, determining an adjusted rating value for the search result by multiplying each of the rating values associated with a second user relating to the search result by an affiliation coefficient determined between the first user and the second user;
determining an average of the adjusted rating values associated with the one or more second users relating to the search result; and
calculating the weighted average rating value for the search result by multiplying the average of the adjusted rating values associated with the one or more second users by a proximity coefficient that is indicative of a geographic distance between the geographic location of the search result and the location of the first user; and
by the computing device, sending the one or more search results as ranked by their weighted rating value for presentation to the first user.

2. The method of claim 1, wherein the affiliation coefficient is based on a determined affinity between the first user and the associated second user.

3. The method of claim 2, wherein if no affinity has been determined between the first user and the associated second user, a predetermined affinity coefficient is used.

4. The method of claim 1, wherein:
the search request further comprises a character string; and
the determining one or more search results comprises comparing the character string with names of one or more places within a threshold distance from the location of the first user.

5. The method of claim 4, wherein comparing the character string with the names comprises attempting to partially or completely match the character string to the name.

6. The method of claim 4, wherein:
the character string is an empty string; and
the search request comprises a current location of the first user and an identity of the first user.

7. The method of claim 1, wherein the one or more search results are associated with a location database comprising the corresponding geographic location of each of the one or more search results.

8. The method of claim 1, wherein the proximity coefficient comprises one of a plurality of predetermined scores between a maximum value and a minimum value, wherein each of the predetermined scores corresponds to a range of geographic distance, the maximum value corresponding to a range of geographic distance closest to the location of the first user, and the minimum value corresponding to a range of geographic distance that is more than a predetermined distance away from the location of the first user.

9. The method of claim 1, wherein:
the first user and each associated second user are users of a social-networking system;
the social-networking system comprises a graph that comprises a plurality of nodes and edges connecting the nodes, wherein:
a first node corresponds to the first user;
one or more second nodes corresponds to one or more second users, respectively; and
the first node is connected to each second node by at least one edge.

10. The method of claim 9, wherein the affiliation coefficient comprises one of a plurality of predetermined scores, wherein each of the predetermined scores corresponds to a type of edge connecting the first node and one of the second nodes.

11. The method of claim 1, wherein the determining the weighted rating value further comprises weighing each of the rating values by an age coefficient, the age coefficient corresponding to an age of the rating value.

12. The method of claim 11, wherein determining the weighted rating value comprises excluding rating values with corresponding ages greater than a predetermined threshold age.

13. The method of claim 1, wherein the search request is received from a mobile computing device associated with the first user, and the location of the first user is determined by the location of the mobile computing device.

14. A system comprising: one or more processors; and a memory coupled to the processors comprising instructions executable by the processors, the processors being operable when executing the instructions to:
receive a search request from a first user, wherein the search request comprises a location of the first user;
determine one or more search results in response to the search request, each of the one or more search results having a corresponding geographic location;
for each search result, determine a weighted average rating value by:
determining one or more rating values associated with the search result, the one or more rating values being associated with one or more second users, respectively;
for each of the rating values, determining an adjusted rating value for the search result by multiplying each of the rating values associated with a second user relating to the search result by an affiliation coefficient determined between the first user and the second user;
determining an average of the adjusted rating values associated with the one or more second users relating to the search result; and
calculating the weighted average rating value for the search result by multiplying the average of the adjusted rating values associated with the one or more second users by a proximity coefficient that is indicative of a geographic distance between the geographic location of the search result and the location of the first user; and
send the one or more search results as ranked by their weighted rating value for presentation to the first user.

15. The system of claim 14, wherein the affiliation coefficient is based on a determined affinity between the first user and the associated second user.

16. The system of claim 15, wherein if no affinity has been determined between the first user and the associated second user, a predetermined affinity coefficient is used.

17. The system of claim 14, wherein:
the search request further comprises a character string; and
the determining one or more search results comprises comparing the character string with names of one or more places within a threshold distance from the location of the first user.

18. The system of claim 14, wherein comparing the character string with the names comprises attempting to partially or completely match the character string to the name.

19. The system of claim 14, wherein:
the character string is an empty string; and
the search request comprises a current location of the first user and an identity of the first user.

20. One or more computer-readable non-transitory storage media embodying software operable when executed to:
receive a search request from a first user, wherein the search request comprises a location of the first user;
determine one or more search results in response to the search request, each of the one or more search results having a corresponding geographic location;
for each search result, determine a weighted average rating value by:
  determining one or more rating values associated with the search result, the one or more rating values being associated with one or more second users, respectively;
  for each of the rating values, determining an adjusted rating value for the search result by multiplying each of the rating values associated with a second user relating to the search result by an affiliation coefficient determined between the first user and the second user;
  determining an average of the adjusted rating values associated with the one or more second users relating to the search result; and
  calculating the weighted average rating value for the search result by multiplying the average of the adjusted rating values associated with the one or more second users by a proximity coefficient that is indicative of a geographic distance between the geographic location of the search result and the location of the first user; and
send the one or more search results as ranked by their weighted rating value for presentation to the first user.

* * * * *